United States Patent [19]
Denk

[11] Patent Number: 4,968,911
[45] Date of Patent: Nov. 6, 1990

[54] CLAM-SHELL STATOR CONSTRUCTION FOR ELECTRICAL MACHINES

[75] Inventor: Joseph Denk, Manhattan Beach, Calif.

[73] Assignee: Allied-Signal Inc., Morris Township, Morris County, N.J.

[21] Appl. No.: 334,666

[22] Filed: Apr. 6, 1989

Related U.S. Application Data

[60] Continuation-in-part of Ser. No. 107,150, Oct. 9, 1987, Pat. No. 4,852,245, Division of Ser. No. 800,184, Nov. 20, 1985, Pat. No. 4,709,180.

[51] Int. Cl.$^5$ ............................................. H02K 15/00
[52] U.S. Cl. ........................................ 310/42; 310/57; 310/179; 310/216; 310/259
[58] Field of Search ............... 310/179, 254, 258, 216, 310/180, 184, 89, 91, 57–59, 42, 43, 156, 259, 218; 29/596, 606

[56] References Cited

U.S. PATENT DOCUMENTS

| | | |
|---|---|---|
| 2,251,673 | 8/1941 | Gillen ................................. 310/42 |
| 3,622,822 | 11/1971 | Lofstrand . | 
| 3,942,054 | 3/1976 | Kristen et al. . |
| 4,079,275 | 3/1978 | Fu . |
| 4,340,830 | 7/1982 | Hoyer-Ellefsen . |
| 4,358,692 | 11/1982 | Hallerback ......................... 310/42 |
| 4,465,946 | 8/1984 | Springer . |
| 4,667,123 | 5/1987 | Denk et al. ........................ 310/42 |
| 4,709,180 | 11/1987 | Denk ................................. 310/43 |
| 4,852,245 | 8/1989 | Denk ................................. 29/596 |

OTHER PUBLICATIONS

Japanese Publication; KOGA; 12/20/62(3 pages); Translation (2 pages).

Primary Examiner—R. Skudy
Attorney, Agent, or Firm—David B. Abel; Robert A. Walsh

[57] ABSTRACT

The invention discloses a dynamoelectric machine having a two piece split-stator for assembly about a shaft mounted rotor. The dynamoelectric machine may readily be incorporated into the design of a device having a rotating shaft such as a jet engine to provide electrical output power.

10 Claims, 3 Drawing Sheets

CLAM-SHELL STATOR CONSTRUCTION FOR ELECTRICAL MACHINES

This is a continuation in part application of Application No. 07/107,150, Oct. 9, 1987, now U.S. Pat. Ser. No. 4,852,245 a division application of Application Serial No. 06/800,184, Nov. 20, 1985, Patent No. 4,709,180.

BACKGROUND OF THE INVENTION

Field of the Invention

The present invention relates generally to the construction and configuration of a stator for electrical machines including both motors and generators, and more particularly to a clam shell stator construction utilizing a split stator core in the form of a pair of half-cylinders with the windings of the stator being supported by a support structure made of non-magnetizable material and having pin connections for phase windings which traverse between the two half-cylinders. The present invention provides a suitable stator structure for use with high magnetic energy permanent magnet, shaft mounted rotors.

In the design and construction of permanent magnet machines, there are three considerations which dictate the design of an improved permanent magnet machine having great appeal to potential purchasers. These three factors are, first, the desire to minimize the cost of the machine, or to provide the most machine for the least money, second, to increase machine efficiency while reducing machine size by utilizing the ever increasing energy product permanent magnets, and third, ease of assembly, disassembly of the machine.

A stator construction and method which substantially satisfies the first two of these design characteristics is disclosed in Assignees U.S. patent applications Ser. No. 06/800,184 issued as U.S. Pat. No. 4,709,180 entitled "Toothless stator Construction for Electrical Machines" and corresponding divisional application No. 07/107,150, Oct. 9, 1987, now U.S. Pat. Ser. No. 4,851,295 entitled "Toothless Stator Electrical Machines Construction Method".

In recent years, high energy product permanent magnets representing significant energy increases over previously known permanent magnets have become available. For example, samarium cobalt permanent magnets previously having an energy product of 27 mega-gauss-oersted (MGO) maximum have recently become available which have an energy product of 30 MGO, and it appears that in the near future an energy product of at least 45 MGO will be achievable by advanced permanent magnets.

A rotor making the maximum use of high energy product permanent magnets is disclosed in Assignee's U.S. Pat. No. 4,667,123, entitled "Two Pole Permanent Magnet Rotor Construction for Toothless Stator Electrical Machines".

SUMMARY OF THE INVENTION

The present invention uses a two piece split winding support structure made of non-magnetizable material in a half-cylinder configuration with a plurality of radially outwardly extending, longitudinal support fins installed thereon, the support fins also being made of non-magnetizable material and preferably manufactured integrally with the half-cylinder portions. Interconnecting electrical contacts are provided for the end turn sections of the phase windings which traverse between half-cylinders.

The copper windings may be conveniently installed in the areas between adjacent support fins on the winding support structure. Since the support fins and the winding support structure need not carry magnetic flux, they can be relatively thin, thereby maximizing the slot area in which the stator windings may be installed around the winding support structure. Since the support fins extend radially outwardly unlike the T-shaped teeth of a conventional stator core, the stator windings may be prewound on a form and easily installed within the slot cells between the support fins. Also, the internal cylindrical portion of the winding support lends itself to the creation of a bore seal and a channel through which liquid coolant may be circulated. Since the material of the winding support structure is not a conductor, additional insulation for the slot liner is unnecessary. Rotational movement of the winding support is inhibited by use of a pin extending through the winding support and a portion of the housing structure.

A split cylindrical flux collector is installed over the winding support structure carrying the stator windings. The flux collector may typically be made of laminated magnetizable material, and is formed as a pair of half-cylinders closely surrounding the outwardly extending tips of the support fins carried by the winding support structure. A cylindrical layer of insulating liner may be installed between the stator windings and the flux collector to insulate the stator windings from the flux collector. As mentioned above, it is important to note that since the support fins and the winding support structure are made of a non-magnetizable, non-conductive material, additional slot lining insulation layers need not be installed between the intersections of the stator winding and the support fins and the winding structure. Since there are no teeth in the stator, cogging is eliminated completely since with no teeth there is no preferred rotor position. The result is a smooth-running machine without skewing of the stator.

The winding support structure is mounted in a split clam shell housing having end bells, which, together with the half-cylindrical portions of the winding support structure, provides a chamber through which coolant fluid may be circulated through the winding area to cool the stator. Due to the greatly reduced amount of insulation required in the stator construction of the present invention, and to the eliminated need for varnish impregnation of slot cells due to the novel construction of the present invention, the pumping of liquid coolant through the copper windings is not substantially inhibited. Therefore, the stator of the present invention is easily and efficiently adaptable to the liquid cooling necessary to allow substantially greater power density.

It is apparent that since the windings may be installed into the outside of the winding support structure between the support fins, it is substantially easier and less labor-intensive to install the stator windings. As a result, the stator windings may be easily prefabricated and then merely laid between the support fins of the winding support structure and attached to the interconnectors, after which the flux collector sections are placed over the winding support structure. It is therefore to be appreciated that the stator of the present invention is substantially easier and cheaper to manufacture than stators utilizing stator cores having inwardly projecting teeth.

It may also be appreciated that the split-stator assembly of the present invention may be coupled with any rotor assembly which provides a strong magnetic field. However, the assembly is particularly useful when integrated into existing machinery which includes a high speed rotating shaft, particularly when the magnet field generating assembly is integrated into the construction of the shaft. Thus, for example, the split-stator machine may be incorporated into the design of an engine, such as a gas turbine engine, to directly provide electrical power or to act as a starter motor for the engine. Within this type of assembly, the clam shell housing, split stator design allows for easy assembly, disassembly, and maintenance of the dynamoelectric machine.

Since the present invention utilizes a stator core which is substantially cylindrical in shape, having no teeth, the tooth losses in a machine constructed according to the teachings of the present invention are effectively zero. Copper losses are somewhat less than those in a conventional machine, although the size of the fully transposed copper strands used in the stator windings are reduced to minimize eddy currents. These eddy currents will be induced due to the toothless design of the stator, in which the magnetic flux cuts the conductors. Core loss is also somewhat less than that in a conventional machine, and the relative total losses in a machine constructed according to the teachings of the present invention are approximately one-third less than the losses in a conventional machine. Accordingly, it is apparent that the present invention represents a highly desirable stator construction having the significant advantages enumerated above, and presenting no relative disadvantage in achieving these advantages.

DESCRIPTION OF THE DRAWINGS

These and other advantages of the present invention are best understood through reference to the drawings, in which.

DETAILED DESCRIPTION OF THE PREFERRED EMBODIMENT

Figure 1:
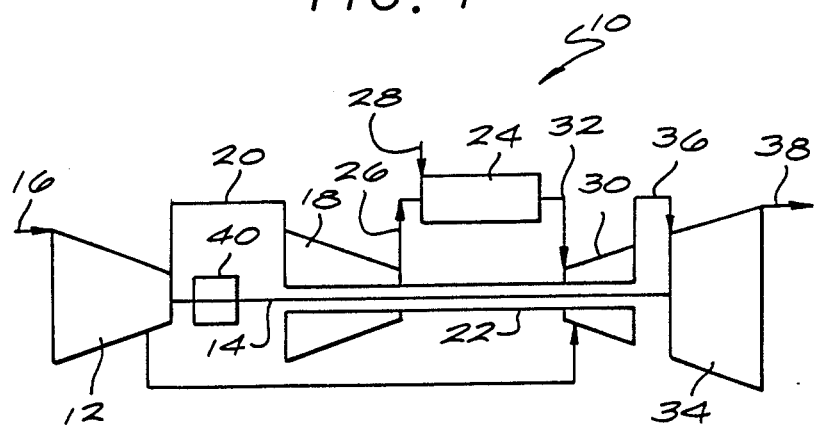
FIG. 1 is a schematic view of an engine including a shaft-mounted dynamoelectric machine.

FIG. 1 schematically illustrates a combustion turbine engine or turbo machine 10. The engine 10 includes a first compressor section 12 which is rotatably driven by a shaft 14. Compressor section 12 inducts atmospheric air at ambient pressure, as is depicted by arrow 16. The air inducted by compressor section 12 is pressurized thereby for delivery to a second compressor section 18 as is depicted by arrow 20. An annular shaft 22 surrounds shaft 14 and rotatably drives the second compressor section 18 to further pressurize the inducted air.

The pressurized air is then delivered to a combustor 24, as depicted by arrow 26, wherein fuel (arrow 28) is mixed therewith to sustain combustion. Pressurized combustion products flow from combustor 24 to a first turbine section 30, as is depicted by arrow 32. The pressurized combustion products are partially expanded in turbine section 30 to rotatably drive shaft 22 and compressor section 18. From turbine section 30, the partially expanded pressurized combustion products flow to a second turbine section 34 via a gas path which is depicted by arrow 36. After further expansion in turbine section 34, the combustion products are exhausted from the engine 10 as depicted by arrow 38. The expansion of combustion products in turbine section 34 rotatably drives the shaft 14 and compressor section 12. A dynamoelectric machine 40 is mounted about the shaft 14. The dynamoelectric machine 40 may be used as a starter to initiate rotation of the shaft 14 to start the engine 10. Additionally, the dynamoelectric machine may be used as a generator of electric power during normal operation of the engine 10

Figure 2:
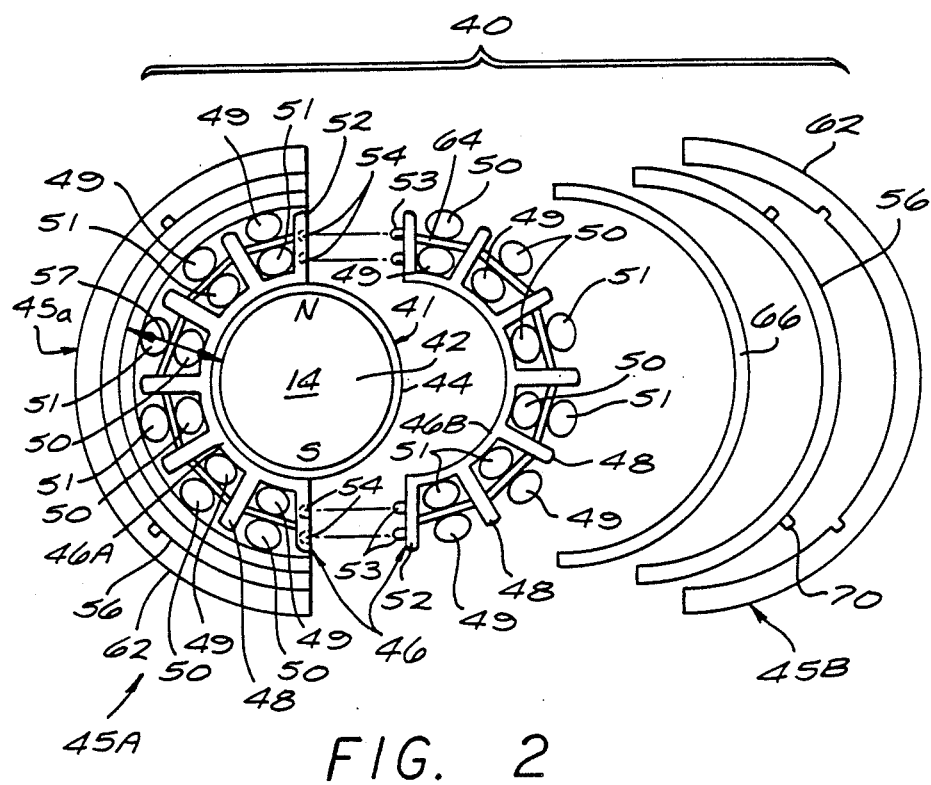
FIG. 2 is a schematic cross-sectional view of the dynamoelectric machine from FIG. 1, constructed according to the teachings of the present invention.

FIGS. 2-6 show details of the construction of the dynamoelectric machine 40 of FIG. 1. FIG. 2 shows a cross-sectional view of the dynamoelectric machine 40, taken perpendicular to the axis of shaft 14 of engine 10. Incorporated into the design of shaft 14 is a two pole permanent magnet rotor 42, surrounded by a sleeve 44, the sleeve 44 preferably having the same outer diameter as the remainder of shaft 14.

The construction of the stator halves 45 (A,B) illustrated in FIG. 2 differs substantially from previous stator designs in that the windings are not mounted on teeth made of magnetizable material, and the stator 45 is split along an axial plane into two stator halves 45A and 45B. A winding support structure 46 (FIG. 4) made of non-magnetizable, non-conductive material is utilized. The winding support structure 46 includes a pair of half-cylindrical portions 46A, 46B for the two stator halves, 45A, 45B. The portions 46A, 46B and are half-cylindrical include radially outwardly extending longitudinal support fins 48 mounted thereon. The support fins 48, extending longitudinally along the cylindrical portion of the winding support structure 46 except at the two ends thereof, provide the areas into which the conductor segments of stranded stator windings 49, 50, and 51 may be inserted. The support fins 48 and the half-cylindrical portions 46A, 46B of the winding support structure 46 are preferably constructed in integral fashion by a molding and curing process. Note that the stator windings are shown schematically in FIG. 2, with the reduced number of insulators described later in conjunction with FIGS. 5 and 6.

The two ends of the half-cylindrical portions 46A, 46B of the winding support structure 46 do not have fins to allow the conductors of the stator windings 49, 50, and 51 lying between the support fins 48 to be interconnected at the ends of the winding support structure 46 by end turn segments, as in a conventional layer wound stator assembly. Each of the half cylindrical portions 46A, 46B also includes a set of four axially aligned, radially extending flanges 52. In order to accommodate the end turn sections of each phase winding which crosses the dividing plane between the two half-cylindrical portions 46A, 46B, a plurality interconnecting pin connections 53, 54 are provided. These pin connections 53, 54 are mounted within connector blocks 55, which are then attached to and extend through the flanges 52. When the two half cylindrical portions 46 A, B are assembled, the pin connections 53, 54 mate, providing the necessary connections for the stator phase windings 49, 50 and 51, between the two stator halves 45A, B.

The magnetic flux path is completed by a two-piece split-cylindrical stator core element or flux collector 56 which is typically of laminated construction, and is made of ferromagnetic material which is mounted about the outer periphery of the winding support structure 46, with the split-cylindrical flux collector 56 extending around the outermost edges of the support fins 48 on the winding support structure 46. It may be appreciated that the stator windings 50 are located on the outside of the cylindrical portion of the winding support structure 46, within the slot areas between the support fins 48, and are contained inside the split-cylindrical flux collector 56.

As illustrated in FIG. 2, the magnetic air gap 57 of this machine extends from outer periphery of the two pole permanent magnet rotor 42 to the inner periphery of the flux collector 56. Such a large magnetic air gap 57 would not be feasible with low energy product magnets, but recently developed high energy product magnets accommodate the large magnetic air gap without substantial reduction of air gap flux density. In order to make the schematically illustrated machine in FIG. 2 practical, it is necessary that the magnets in the two pole permanent magnet rotor 42 are high energy product magnets such as samarium cobalt or neodymium-iron-boron magnets, the former of which are presently available with magnetic energy products of 30 MGO, (MegaGauso Oested) and the latter of which are available with magnetic energy products of 45 MGO.

Figure 3:
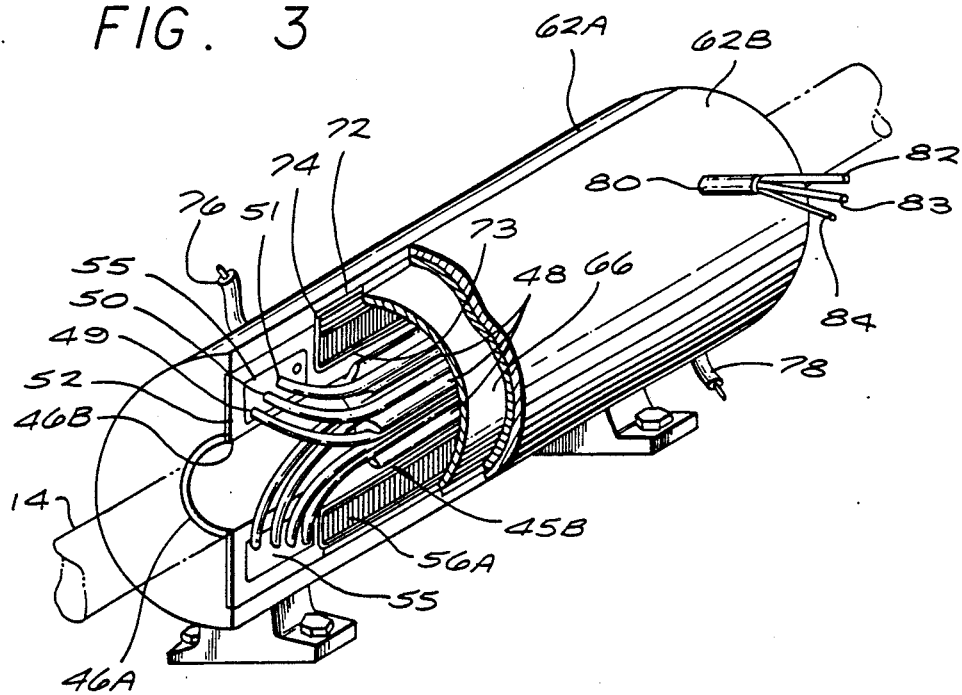
FIG. 3 is a cutaway view of the dynamoelectric machine of the present invention.
Figure 4:
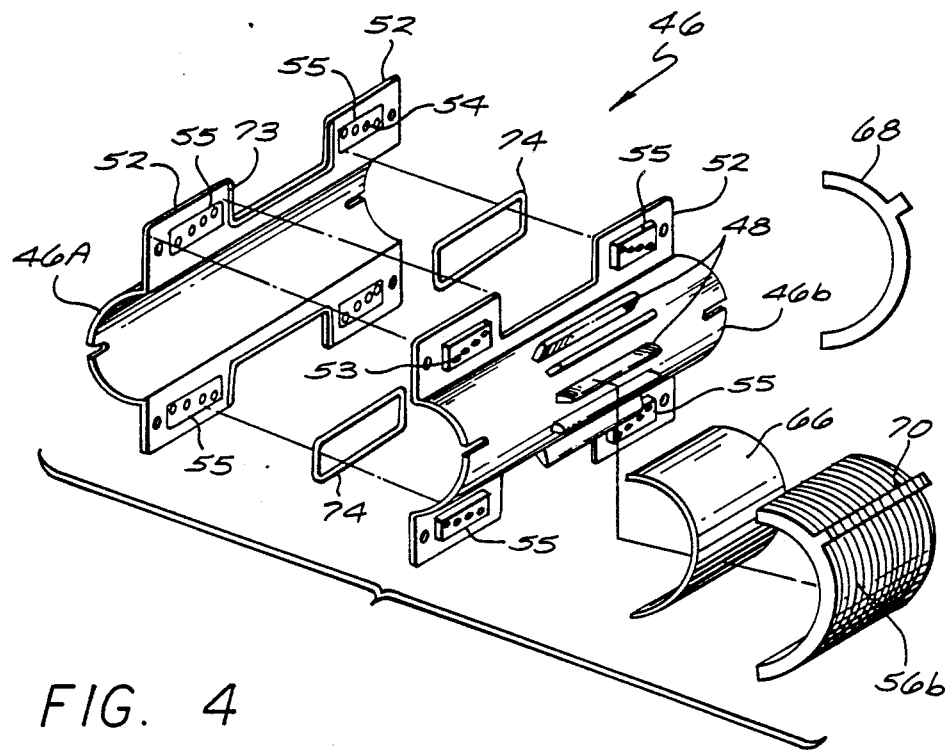
FIG. 4 is an exploded view of the flux collector ring and the winding support assembly of the dynamoelectric machine shown in FIG. 3.

Moving now to the specific construction of the machine illustrated in FIGS. 2, 3, and 4 the dynamoelectric machine 40 is illustrated as being enclosed within split-housing 62. When assembled, the stator halves 45 A, B, each being contained within one half of the split-housing 62, may be readily assembled, forming an essentially cylindrical machine 40.

The winding support structure 46 is illustrated in FIG. 4, and is essentially a pair of half-cylinders with a plurality of longitudinally extending support fins 48 extending radially outwardly from the cylindrical portions. Winding slot areas are located between adjacent support fins 48. In the embodiment illustrated in the figures, each half of the support structure 46 has seven support fins 48 mounted thereon, two of which are located at the edges of the half-cylinders. When assembled, the support structure 46 includes twelve winding slot areas located between the support fins 48. It should be noted that the number of slot areas may vary as in conventional stators. For example a three phase, two pole machine may have 6(n) slots, where n is a whole number. The winding support structure 46 is made of non-magnetizable material, typically either a high temperature engineering plastic or ceramic, with the support fins 48, flanges 52, and the cylindrical portion of the winding support structures 46 manufactured integrally. In the preferred embodiment, a plastic such as polyamide-imide is used, which is commercially available under the trademark TORLON 5030.

It may be noted from FIG. 4 that support fins 48 are longitudinally mounted on the cylindrical portions of the winding support structures 46 intermediate the two ends, with portions at both ends of the cylindrical portion of the winding support structure 46 not carrying the support fins 48. Hence, the cylindrical portion of the winding support structure 46 is somewhat longer than the support fins 48, and extends from the support fins 48 at both ends of the winding support structure 48. As mentioned above, the ends of the winding support structure 46 not carrying the support fins 48 are where the end turn sections of stator windings 49, 50, and 51 are located. The interconnections between the portions of stator windings 49, 50, and 51 crossing between the two stator halves 45 A, B are accommodated by pin connections 53, 54.

Figures 5, 6:
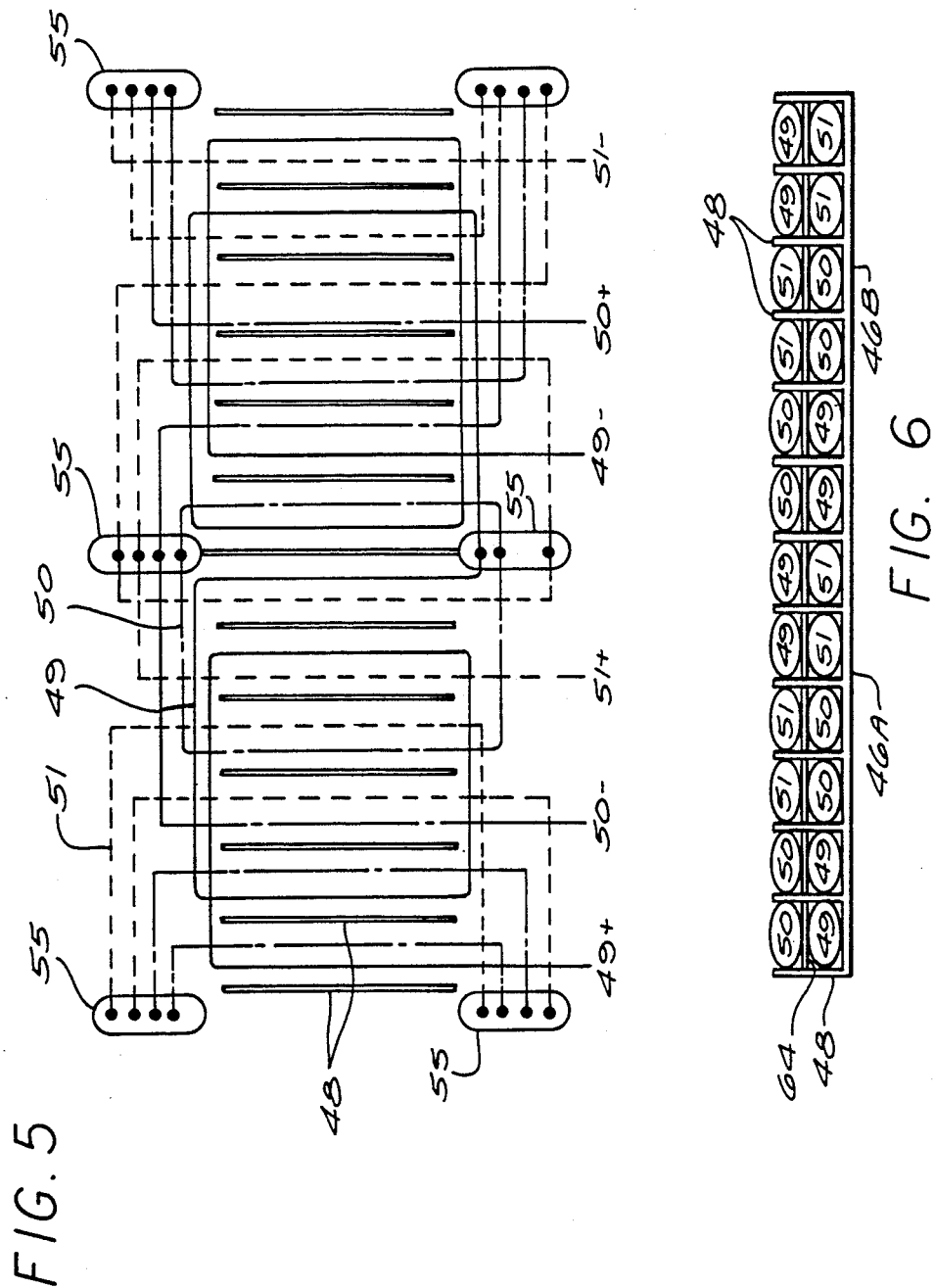
FIG. 5 is a winding diagram for the machine of FIG. 3.
FIG. 6 is a schematic projection view of the stator windings within the slots for the winding diagram of FIG. 5.

A problem associated with the physical design of the machine involves accommodating the end turn sections and coolant containment within the two separable halves of the stator. The winding diagram of FIG. 5 depicts a three phase, two pole, single turn, conventional layer wound stator assembly having twelve slots, wherein each slot will accommodate conductors from two pole phase groups as shown in FIG. 6. The centers of these pole phase groups for each phase winding 49, 50, 51, will be spaced apart by 180 degrees. For a preferred two-thirds pitch arrangement for each pole phase group there may potentially be seven end turn windings which will cross between the two split stator halves 45A 453. At a minimum, the first phase may have one crossing point, while the second and third phases 50, 51 each have seven crossing points, thereby requiring a total of fifteen cross over connections. These interconnections are preferably accommodated by the male/female type pin connections 53, 54.

The stator windings 49, 50, 51 may be prefabricated on forms, and then laid into the slot areas between the support fins 48 in the winding support structure 46. The stator 45 will typically include two conductors from two different phase windings (i.e. 49, 50) installed into each slot area, each of which conductors may have multiple strands. Since the two conductors installed into each slot are different phases, they are separated by insulation 64.

The stator windings 49, 50, 51 are of substantially smaller diameter stranding than in previous stator designs. For example, in a small 250 watt machine each of the conductors may, for example, be made up of twenty-eight strands of #39 AWG wire. The purpose of using such fine wire is that eddy currents are greatly reduced by using smaller size wires, an important consideration since all of the flux from the rotor will cut the wire in slot areas in a toothless stator design.

Once the stator windings 49, 50, 51 have been wound and are mounted in the slot areas around the winding support structure 46, the flux collector ring 56 made from a pair of half-cylinders of laminated magnetizable material such as electrical steel is installed around the outer periphery of the winding support structure 46 containing the stator windings 49, 50, 51. Since the flux collector ring 56 is made of magnetizable material which is typically conductive, a cylindrical insulating liner 61 must be installed between the inner diameter of the flux collector ring 56 and the outer diameter of the winding support structures 46 carrying the stator windings 50. It is important to note that since the winding support structure 46 is a non-conductor, the only insulators necessary are the insulation 64 and the insulating liner 66. The stator windings 49, 50, 51 need not be impregnated with varnish, and therefore may easily be cooled by flowing coolant therethrough.

The stator element or flux collector 56 is preferably made of a plurality of c-shaped flux collector ring 68 (FIG. 4). Each flux collector ring lamination is a full 180 degree half-cylinder section with raised portions 70 arranged around the outer periphery. The raised portions 70 function to support the flux collector 56 inside the housing 62. It is important that upon assembly, the two sections of the flux collector 56A,B tightly abut one another to prevent a magnetic air gap which may lead to a preferred rotor orientation. Accordingly, the abutting portions of the split-housing 62A,B, as well as the support structures 46A,B include grooves 72, 73 to accommodate an O-ring seal 74. The O-ring seal 74 prevents stator coolant from escaping either via the rotor or directly out of the machine 40.

The flux collector sections 56A,B are assembled over the assembled winding support structure half cylindrical portions 46A, 46B carrying the stator windings 49, 50, 51 the insulating liner therebetween, and the housing sections 62A,B are then mounted about the assembled stator halves 45A,B, as illustrated in FIGS. 2, 3 and 4. The housing 62 has one or a pair of coolant inlet channels 76 at one end, and coolant outlet channels 78 at the other end. It may therefore be appreciated that coolant may be flowed into the housing 62 through the coolant inlet channel 76, through the unvarnished stator windings 49, 50, 51, and out of the housing 62 through the coolant outlet channel 78 to cool the stator halves 45A,B of the machine 40. An additional aperture 80 in the housing 62 is used to bring winding leads 82, 83 and 84 from the stator windings 49, 50, 51 through the housing 62. Aperture 80 is sealed to prevent coolant leaks.

The machine illustrated in the figures may be constructed at substantially lower cost than a conventional electrical machine and directly incorporated into a power system such as an engine. The stator windings 49, 50 and 51 may be prewound around a form and then laid into slots between the support fins 48 on the winding support structure 46. The individual stator halves 45A,B may be replaced if a failure occurs. Additionally, the stator assemblies 45A,B are adapted so as to be readily preassembled and snapped together about a shaft mounted rotor. It is therefore apparent that a machine constructed according to the teachings of the present invention will have significant practical advantages, advances the state of the art, and provides a highly advantageous construction for dynamoelectric machines.

Although preferred embodiments are specifically illustrated and described herein, it will be appreciated that many modifications and variations of the present invention are possible in light of the above teaching to those skilled in the art. It is preferred, therefore, that the present invention be limited not by the specific disclosure herein, but only by the appended claims.

I claim:

1. A dynamoelectric machine for use with a machine assembly having a rotating shaft comprising:
    rotor means for providing a high strength magnetic field, said rotor means secured for rotation with said shaft;
    a pair of partially cylindrical stator winding support structures each including a plurality of radially outwardly extending longitudinal support fins to define a plurality of stator winding slots therebetween, said support structures configured for assembly about said rotor means to form a cylinder about said rotor means;
    a plurality of stator windings each including conductors mounted within said winding slots of said support structures and end turn sections electrically connecting said conductors, at least one of said plurality of stator windings having said conductors mounted on both of said pair of partially cylinder stator winding support structures and having said end turn sections connecting said conductors divided into segments located on each of said support structures;
    interconnecting means for providing electrical connection for said divided segments of said end turn sections of said at least one stator winding;
    a pair of half cylindrical stator core elements disposed about said conductor segments of said plurality of stator windings; and
    split housing means for containing said support structures, said stator windings, and said stator core elements, and for maintaining the positions thereof about said rotor means.

2. The dynamoelectric machine of claim 1 further comprising:
    means for providing coolant flow through said housing means; and
    means for preventing leaking of said coolant from said housing means.

3. The dynamoelectric machine of claim 1 wherein said stator core elements each further comprise:
    a plurality of full 180 degree half cylinder shaped laminate disks, said disks being secured to one-another to form said a whole stator core element.

4. The dynamoelectric machine of claim 1 wherein said interconnecting means comprises:
    a set of four connector blocks mounted on each of said support structures engaging the corresponding connector block on the other of said support structures.

5. The dynamoelectric machine of claim 1 wherein said rotor means further comprises:
    a torque transmitting sleeve section of non-magnetic, high strength material; said sleeve section forming a segment of said shaft of said machine assembly, and
    a high strength permanent magnet-mounted inside said sleeve section.

6. A stator for a dynamoelectric machine, said stator comprising:
    a pair of half cylinder stator support structures of non magnetizeable material;
    a plurality of stator phase windings having stator winding sections disposed about each of said support structures;
    interconnecting means for providing electrical connections between said stator winding sections disposed about one of said pair of half cylinder stator support structures and corresponding stator winding sections of the same stator phase winding disposed about the other of said support structures;
    a pair of flux collector cores, one each of said cores disposed about one of said pair of half cylinder stator support structures including said windings; and
    a housing assembly containing said support structures, said windings, and said cores.

7. The stator of claim 6 wherein said stator support structures further comprise:
    a plurality of radially outwardly extending longitudinal support fins, said fins defining therebetween slots for said stator phase windings; and
    a set of four axially aligned flanges, said flanges extending radially outward from the edges of said half cylinder support structures, and accommodating said interconnecting means.

8. The stator of claim 6 wherein said stator winding sections further comprise:
three individual phase windings, said phase windings being conventionally wound for use with a two pole rotor, and each of said phase windings having two pole phase groups, the center of said pole phase groups which are spaced 180 degrees apart.

9. The stator of claim 7 wherein said stator has three phase windings and said support fins define 6(n) slot areas, where n is a whole number, for use with a two pole rotor.

10. The stator of claim 9 wherein said stator support structure including said flanges and said support fins is formed integrally from a high temperature engineering material selected from the group consisting of plastics and ceramics.

* * * * *